(12) United States Patent
Shankar et al.

(10) Patent No.: US 9,436,943 B1
(45) Date of Patent: Sep. 6, 2016

(54) METHOD AND SYSTEM FOR AUTHORIZING LONG-LIVED TRANSACTIONS

(71) Applicant: Google Inc., Mountain View, CA (US)

(72) Inventors: Umesh Shankar, Mountain View, CA (US); Glenn Edward Durfee, Mountain View, CA (US); Darrell Kindred, Mountain View, CA (US)

(73) Assignee: Google Inc., Mountain View, CA (US)

( * ) Notice: Subject to any disclaimer, the term of this patent is extended or adjusted under 35 U.S.C. 154(b) by 653 days.

(21) Appl. No.: 13/793,097

(22) Filed: Mar. 11, 2013

Related U.S. Application Data (60) Provisional application No. 61/610,297, filed on Mar. 13, 2012.

(51) Int. Cl.
*G06F 5/00* (2006.01)
*G06Q 20/38* (2012.01)

(52) U.S. Cl.
CPC .................. G06Q 20/3821 (2013.01)

(58) Field of Classification Search
None
See application file for complete search history.

(56) References Cited

U.S. PATENT DOCUMENTS

| | | | |
|---|---|---|---|
| 6,671,716 B1 * | 12/2003 | Diedrichsen et al. | 709/203 |
| 7,865,603 B2 | 1/2011 | Braddy et al. | |
| 8,261,320 B1 | 9/2012 | Serenyi et al. | |
| 2008/0168547 A1 | 7/2008 | Cheeniyil et al. | |
| 2010/0319051 A1 | 12/2010 | Bafna et al. | |
| 2011/0283283 A1 * | 11/2011 | Kuno et al. | 718/101 |
| 2013/0061301 A1 * | 3/2013 | Novak et al. | 726/6 |
| 2013/0179952 A1 * | 7/2013 | O'Donnell | G06F 21/335 726/6 |

* cited by examiner

*Primary Examiner* — Kimberly Berona
*Assistant Examiner* — Joseph W King
(74) *Attorney, Agent, or Firm* — Fox Rothschild LLP (57) ABSTRACT

A method of authorizing a transaction may include receiving, by a hosted service from a client device, a request to access an account and determining whether a user of the client device is permitted to access the account. The method may include, in response to determining that the user is permitted to access the account, receiving, from the client device, a request to initiate a transaction, determining whether the transaction is a long-lived transaction, in response to determining that the transaction is a long-lived transaction, creating a transaction credential associated with the long-lived transaction, and determining, based at least in part on the transaction credential, whether the execution of the long-lived transaction is authorized.

23 Claims, 3 Drawing Sheets

METHOD AND SYSTEM FOR AUTHORIZING LONG-LIVED TRANSACTIONS

RELATED APPLICATIONS

This application claims the priority benefit of U.S. Provisional Patent Application No. 61/610,297 filed on Mar. 13, 2012, the disclosure of which is incorporated herein by reference in its entirety.

BACKGROUND

Data access or other transactions are typically authorized when first accepted. However, such transactions may execute in the future when the credentials provided at the time of authorization have expired. For example, a credential used to authorize a long-running or a delayed transaction may expire prior to the execution of the transaction.

This document describes methods and systems that are directed to addressing some of the problems described above, and/or other problems.

SUMMARY

In an embodiment, a method of authorizing a transaction may include receiving, by a hosted service from a client device, a request to access an account and determining whether a user of the client device is permitted to access the account. The method may include, in response to determining that the user is permitted to access the account, receiving, from the client device, a request to initiate a transaction, determining whether the transaction is a long-lived transaction, in response to determining that the transaction is a long-lived transaction, creating a transaction credential associated with the long-lived transaction, and determining, based at least in part on the transaction credential, whether the execution of the long-lived transaction is authorized.

In an embodiment, a system for authorizing a transaction may include a computing device and a computer-readable storage medium in communication with the storage device. The computer-readable storage medium may include one or more programming instructions that, when executed, cause the computing device to receive, by a hosted service from a client device, a request to access an account and determine whether a user of the client device is permitted to access the account. The computer-readable storage medium may include one or more programming instructions that, when executed, cause the computing device to, in response to determining that the user is permitted to access the account, receive, from the client device, a request to initiate a transaction, determine whether the transaction is a long-lived transaction, in response to determining that the transaction is a long-lived transaction, create a transaction credential associated with the long-lived transaction, and determine, based at least in part on the transaction credential, whether the execution of the long-lived transaction is authorized.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" or a "computing device" refers to a device that includes a processor and tangible, computer-readable memory. The memory may contain programming instructions that, when executed by the processor, cause the device to perform one or more operations according to the programming instructions. Examples of electronic devices and/or computing devices include personal computers, gaming systems, televisions, and portable electronic devices such as smartphones, personal digital assistants, cameras, tablet computers, laptop computers, media players and the like.

A "client device" refers to an electronic device that is configured to access one or more administered resources over a network. A client device may be a portable or stationary electronic device. A "client application" refers to an application program configured to instruct a client device to perform one or more tasks.

A "cloud computing service" or a "hosted service" refers to one or more electronic devices that store data at a facility that is remote from the locations of a client device. The data may include application data, data files, programming instructions, and/or other data.

A "datastore" is a tangible, computer-readable memory device, or a group of such devices, within a hosted service.

A "data resource" is an electronic file containing information that is accessible by a client device, such as a document file, an electronic mail message, a media file (e.g., photo or video), a social networking message, a user profile, or other data.

A "management server" refers to an electronic device that is configured to apply an administrative policy to a client device. A management server device may include, without limitation, a server, a mainframe computer, a networked computer, a processor-based device, a virtual machine and/or the like.

A "megastore" refers to a scalable storage system designed for interactive services.

A "user" or "resource" (when the term is used outside of the context of "data resource") means a person, service or software application of a cloud computing service.

Figure 1:
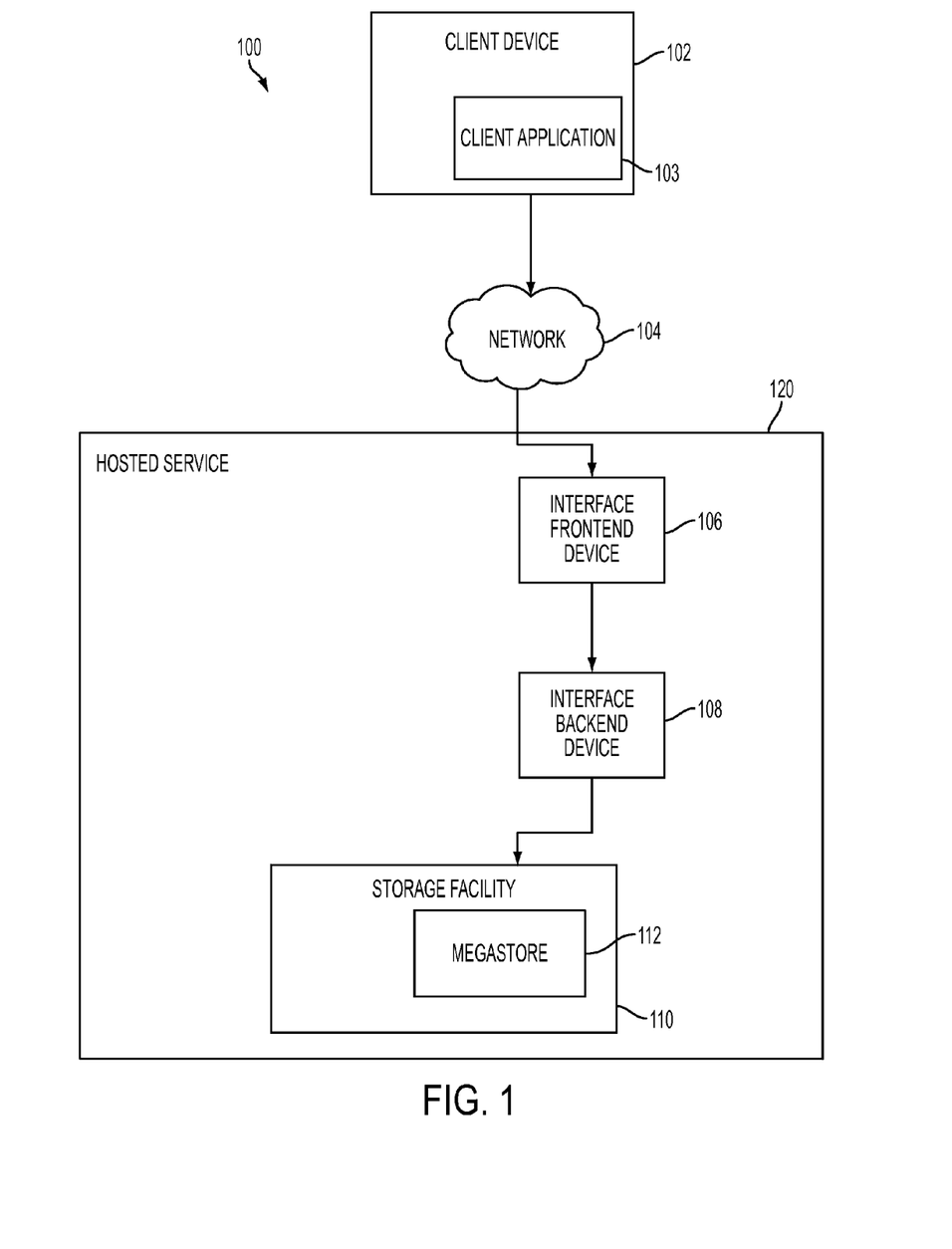
FIG. 1 depicts an example of various elements of a hosted service according to an embodiment.

FIG. 1 illustrates a system 100 for transferring information between a client device 102 and a hosted service 120 according to an embodiment. In an embodiment, one or more client devices 102 may be connected to one or more communication networks 104. In an embodiment, client device 102 may include a tangible, computer-readable memory on which a client application 103 may be stored.

The communication network 104 may be connected to hosted service 120. The hosted service 120 stores data in one or more storage facilities 110. Storage facilities 110 may include one or more data servers having a tangible, computer-readable memory to store data. The storage facilities 110 may be scalable. In an embodiment, one or more storage facilities 110 may store one or more megastores 112. A megastore 112 may be a scalable storage system designed for interactive services. In an embodiment, a storage facility and/or a megastore may store data for the hosted service 120. The data may be of a particular format. For example, data may include Binary Large Object (BLOB) data, distributed file system (e.g., Network File System) data, database data and/or the like. These examples are merely illustrative, and data in any suitable format may be used within the scope of this disclosure.

In various embodiments, the communication network 104 may be a local area network (LAN), a wide area network (WAN), a mobile or cellular communication network, an extranet, an intranet, the Internet and/or the like. In an embodiment, the communication network 104 may provide communication capability between the client device 102, an interface frontend device 106 and/or an interface backend device 108 of the hosted service 120. The client device 102 may communicate across the network 104 using any suitable communications protocol, such as Transmission Control Protocol/Internet Protocol (TCP/IP), Hypertext Transfer Protocol (HTTP), Secure Shell Remote Protocol (SSH), Application Program Interfaces (API), Secure Sockets Layer Protocol (SSL), Transport Layer Security Protocol (TLS) or any other suitable protocol. Although FIG. 1 only shows one client device 102, multiple client devices may communicate with the hosted service 120 across one or more networks 104.

Interface frontend device 106 may operate as a management server to receive requests from and send responses to a client device 102. The interface frontend device 106 may include a processor in communication with a computer-readable storage medium. The interface frontend device 106 may be in communication with one or more client devices 102 and/or the interface backend device 108. The interface frontend device 106, although depicted as a single computer system, may be implemented as multiple devices. The interface frontend device 106 may receive messages (e.g., requests) from the client device 102 and may parse the request into a format that can be used by the hosted service 120, such as a remote procedure call (RPC) to a management server such as the interface frontend device 106. The interface frontend device 106 may prepare responses generated by the hosted service 120 for transmission to the client 102.

In some embodiments, the interface frontend device 106 may include programming instructions configured to manage uploads and downloads of large files. This may include functionality such as pausing, resuming, and recovering an upload from time-out. The interface frontend device 106 may monitor load information and update logs, for example, to track and protect against denial of service (DOS) attacks. Some or all of the data resources stored in each storage facility 110 may be stored in encrypted format or unencrypted format.

The interface backend device 108 may include a processor in communication with a computer-readable storage medium. The interface backend device 108 may be in communication with one or more client devices 102 and/or the interface frontend device 106. The interface backend device 108, although depicted as a single computer system, may be implemented as multiple devices. The interface backend device 108 may operate as an authentication server to handle authentication of client requests, manage data resources and metadata, and key retrieval and distribution. In some embodiments, data management may be primarily or fully performed by the interface backend device 108, while external communications may be primarily or fully performed by the interface frontend device 106. Thus, in such embodiments, the interface backend device 108 may isolate the data resources from the client-facing interface frontend device 106 until authentication is performed.

Figure 2:
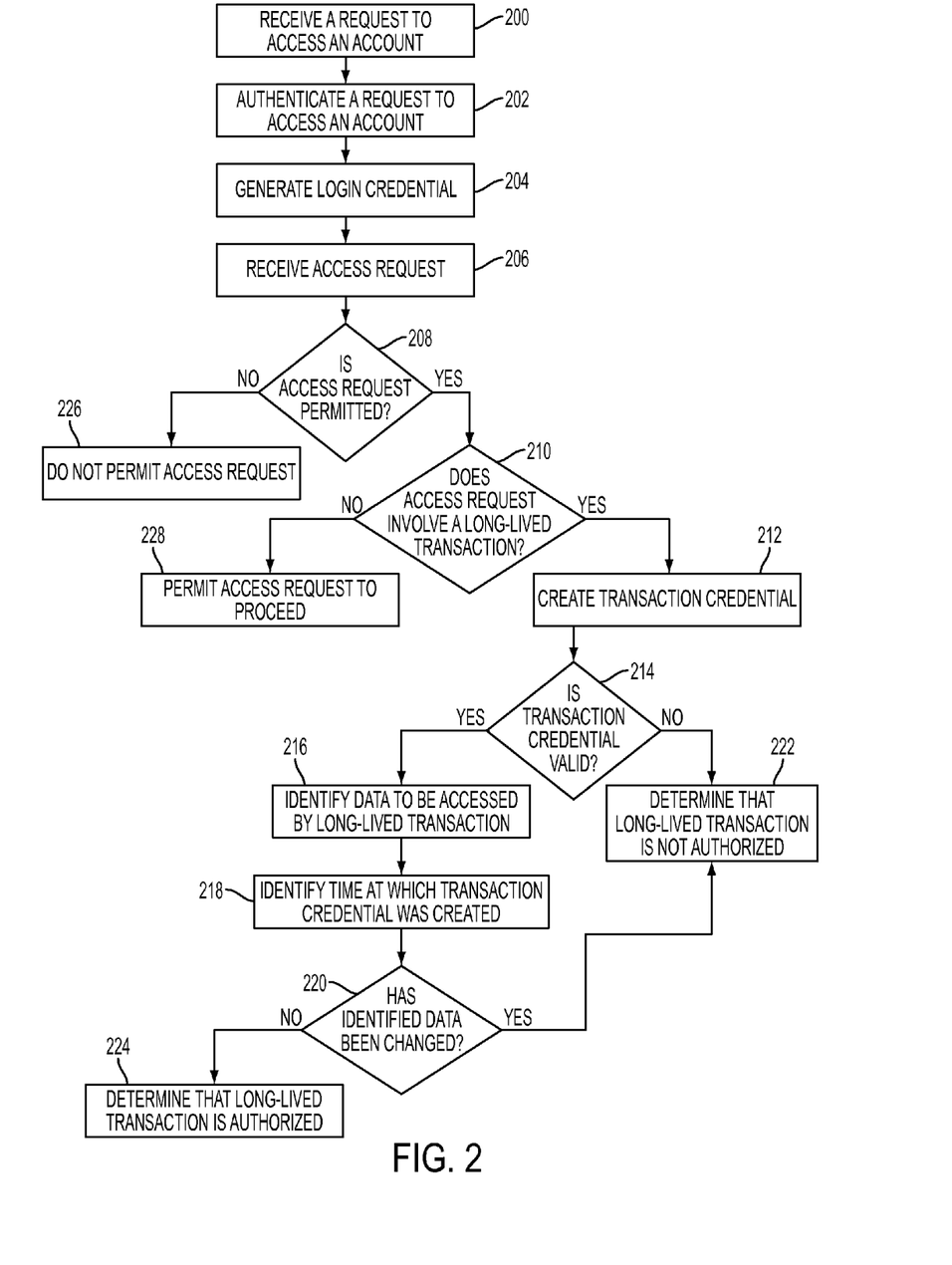
FIG. 2 depicts an example process for authorizing a transaction according to an embodiment.

FIG. 2 illustrates steps that may be followed to authorize a transaction that requests access to a hosted service according to an embodiment. As illustrated by FIG. 2, a hosted service may receive 200 a request to access a user account. A user account may be an email account, a social networking account, a document management account, a multimedia account, an Internet account and/or the like. In an embodiment, the request to access an account may be received 200 from a client device. The request to access an account may include information unique to a user requesting access to an account. For example, the request to access an account may include an indication of a username and password associated with a user.

In an embodiment, a hosted service may authenticate 202 a received request to access an account. In an embodiment, an interface frontend device and/or an interface backend device may authenticate 202 the received request to access an account. A request to access an account may be authenticated 202 by comparing at least a portion of information from the request to account information. In an embodiment, account information may include information pertaining to one or more user accounts, such as, for example, information that a user provided when registering for an account. Account information may include a user's name, address, email address, username, password and/or the like. In an embodiment, account information may be stored by the hosted service. Alternatively, the account information may be stored remotely from the hosted service and may be accessed by the hosted service.

A request to access an account may be authenticated 202, for example, by determining whether account information for one or more user accounts corresponds to the username and/or password from a request to access an account. If a username and password included in a request both correspond to a username and password associated with a user account, the request may be authenticated 202. If a username and/or password included in a request do not correspond to a username and password associated with a user account, the request may not be authenticated.

Once a request to access an account is authenticated 202, a login credential may be generated 204. A login credential may be an electronic file or data object that may indicate whether a user is validly logged into an account. For example, if a user is successfully logged into an account, the corresponding login credential may include an indication that the user is logged in. In an embodiment, if a user is not logged into an account or if a user's session is terminated or expires, a login credential may indicate that a user is not logged in. For example, if a user logs out of the user's account, the associated login credential may be updated to reflect that the user is no longer logged in. Similarly, if a user's account session expires, such as by timing out, the associated login credential may be updated to reflect that the user is no longer logged in.

In an embodiment, a user's session may expire after a period of time, and a login credential may be updated accordingly. For example, a user's session may expire after an hour if it is not terminated earlier. Additional and/or alternate time periods may be used within the scope of this disclosure.

In an embodiment, a login credential may be used to authorize one or more access requests made by a user. An access request may be a request to access one or more data resources of a hosted service. For example, in a document management service, an access request may be a request to open a document. In an embodiment, an access request may include a request to modify, update, send, receive, upload, download and/or otherwise manipulate one or more data resources. For example, an access request may include uploading a file to and/or downloading a file from a hosted service.

In an embodiment, an access request may be received 206. The access request may be received 206 by the hosted service, the frontend interface device and/or the backend interface device. In an embodiment, the access request may be received 206 from one or more client devices.

In an embodiment, the hosted service may determine 208 whether an access request is permitted. The hosted service may determine 208 whether an access request is permitted by, for example, determining whether a user is logged into an account based on a corresponding login credential. If a login credential indicates that a user is logged into an account, one or more access requests may be permitted. If a login credential indicates that a user is not logged into an account, one or more access requests may not be permitted 226.

In an embodiment, if the access request is permitted, the hosted service may determine 210 whether an access request involves performing a potentially long-lived transaction. A long-lived transaction is a transaction that may begin executing after a period of time from when the access request is received 206 or a transaction that may finish executing after a period of time from when the access request is received 206. For example, a transaction involving the upload or download of a large file or files, the size of which in aggregate is large, may be considered a long-lived transaction because execution of the transaction may take a long period of time. As another example, a transaction that is scheduled to be performed by a device that is overbooked, a transaction that is assigned to a long queue for execution, or a transaction, the execution of which may otherwise be delayed, may be considered a long-lived transaction because the execution of the transaction may not begin for a period of time after the access request is received 206.

In an embodiment, determining 210 whether an access request involves performing a long-lived transaction may be based on the type of the transaction or transactions associated with the access request. For example, an upload transaction of files that exceed a certain size may be classified as a long-lived transaction. Similarly, a download transaction of files that exceed a certain size may be classified as a long-lived transaction. Whether a transaction is a long-lived transaction may be determined by comparing a type associated with the transaction with a database or other listing of types of long-lived transactions. For example, if the type is included in the database or list, the transaction may be determined to be a long-lived transaction.

In another embodiment, determining 210 whether an access request involves performing a long-lived transaction may be based on information received from a user. In response to receiving a request to initiate a transaction, a user may be asked whether the transaction should be designated as a long-lived transaction. For example, a user may be asked whether the user would like the transaction to execute or continue executing after the user has logged out of the user's account. In response to receiving an indication from the user that a transaction should be a long-lived transaction, the transaction may be determined as such. In response to receiving an indication from a user that a transaction should not be a long-lived transaction, the transaction may not be determined as a long-lived transaction.

In yet another embodiment, determining 210 whether an access request involves performing a long-lived transaction may be based on the status of one or more components associated with the hosted service. A component of a hosted service may refer to hardware, software and/or other resources used by a hosted service. Examples of components may include, for example, a datacenter, a server, a mainframe, a database, a software application, a network and/or the like.

In an embodiment, one or more components of the hosted service may have a status associated with them. A status may be an indication of the availability and/or operation status of a component. Examples of statuses include, without limitation, active, offline, undergoing maintenance, delayed and/or the like.

In an embodiment, if a possibility exists that completion of a transaction may be delayed because of the status of one or more components of a hosted service, a transaction may be determined to be a long-lived transaction. For example, if a datacenter, a server or other component of a hosted service is undergoing maintenance, and a transaction will not be able to execute until after the component is brought back online, the transaction may be determined to be a long-lived transaction. Similarly, if a datacenter, a server or other component of a hosted service is experiencing technical difficulties, is overloaded, overbooked or otherwise unavailable or delayed, a transaction that requires access to the component or that will be executed at least in part by the component may be determined to be a long-lived transaction.

In response to determining 210 that an access request does not involve performing a long-lived transaction, the access request may be permitted to proceed 228.

In response to determining 210 that an access request involves performing a long-lived transaction, a transaction credential associated with the long-lived transaction may be created 212. In an embodiment, a transaction credential may be created 212 by the hosted service. Alternatively, a transaction credential may be created 212 by a computing device in communication with the hosted service. In an embodiment, a transaction credential may be created 212 by a computing device that is not the client device making an access request.

A transaction credential may include an indication of whether an associated long-lived transaction is valid. A transaction credential may be used to authorize a long-lived transaction independently from a login credential. For example, a transaction credential may be used to authorize a long-lived transaction even after an associated login credential under which the corresponding access request was made has terminated or expired. In an embodiment, a transaction credential may include an indication of a time period during which the long-lived transaction is authorized to execute. For example, a transaction credential may include an indication that a long-lived transaction is authorized to execute during the next 24 hours. In an embodiment, a transaction credential may include an indication of a date and/or time until which the long-lived transaction is authorized to execute. For example, a transaction credential may include an indication that a long-lived transaction is authorized to execute until Dec. 31, 2012. Additional and/or alternate time periods and/or dates and/or times may be used within the scope of this disclosure.

In an embodiment, a time period within which a transaction credential is valid or a date and/or time until which a transaction credential is valid may be determined based on the type of long-lived transaction. For example, all upload or download transactions may be valid for 24 hours. Additional and/or alternate time periods may be used within the scope of this disclosure.

A time period within which a transaction credential is valid or a date and/or time until which a transaction credential is valid may be determined by a user. For example, a user may provide an indication as to how long or until when a transaction should be valid.

In an embodiment, at least a portion of information within a transaction credential may be updated, modified, and/or the like. For example, a time within which a transaction credential is valid or a date and/or time until which a transaction credential is valid may be updated. For instance, a date and/or time until which a transaction credential is valid may be extended if execution of the associated long-lived transaction has not or is not scheduled to be completed by the date and/or time.

In an embodiment, information associated with a transaction credential may be updated automatically. Information associated with a transaction credential may be updated automatically based on the type of corresponding long-lived transaction, the status associated with one or more components of a hosted service and/or the like. For example, a date and/or time until which a transaction credential associated with a long-lived upload transaction is valid may be automatically updated if the long-lived transaction has not started executing as of the date and/or time or a time period in advance of the date and/or time, or if the long-lived transaction has not yet completed executing as of the date and/or time or a time period in advance of the date and/or time. As another example, if a component on which a long-lived transaction is to execute is unavailable as of a date and/or time for which a transaction credential is valid, the date and/or time may be automatically extended.

In an embodiment, information associated with a transaction credential may be updated based on information received from a user. For example, a user may indicate that the time period within which a transaction credential is valid or a date and/or time until which a transaction credential is valid should be extended.

Referring back to FIG. 2, in an embodiment, a determination 214 of whether a long-lived transaction is authorized may be made. In an embodiment, if a transaction credential associated with a long-lived transaction to be authorized includes an indication that the long-lived transaction is invalid, the long-lived transaction may not be authorized. For example, if a time period within which a transaction credential is valid has expired, an associated long-lived transaction may not be authorized 222.

In an embodiment, if a transaction credential associated with a long-lived transaction to be authorized includes an indication that the long-lived transaction is valid, at least a portion of data that may be accessed or used by the long-lived transaction may be identified 216. In an embodiment, a long-lived transaction may only be permitted to access or use data that has not been modified since the creation of the transaction credential. As such, a long-lived transaction may only be able to access and/or use data that was available had execution of the long-lived transaction not been postponed or delayed.

A time at which a transaction credential was created for a long-lived transaction may be determined 218. It may be determined 220 whether any portion of the identified data has been altered, modified, updated, deleted and/or otherwise changed since the time at which the transaction credential was created. If any portion of the identified data has been altered, modified, updated, deleted and/or otherwise changed since the time at which the transaction credential was created, the long-lived transaction may not be authorized 222. If no portion of the identified data has been altered, modified, updated, deleted and/or otherwise changed since the time at which the transaction credential was created, the long-lived transaction may be authorized 224.

For example, if a long-lived transaction involves unwrapping wrapped keys, only keys that are wrapped earlier than the time at which a transaction credential was created may be unwrapped. A wrapped key refers to an encryption key that is itself encrypted using any suitable encryption technique, such as encryption with a key that is derived from a user's password.

In an embodiment, if a long-lived transaction is authorized 224, it may continue to execute until at least the next validation time. If a long-lived transaction is not authorized 222, its execution may be terminated, or, if the long-lived transaction has not yet begun to execute, its execution may not be started.

In an embodiment, the determination 214 of whether a long-lived transaction is authorized may be made at one or more times. The determination 214 of whether a long-lived transaction is authorized may be made before the long-lived transaction begins to execute. In an embodiment, a determination 214 of whether a long-lived transaction is authorized may be made at one or more times during execution of the long-lived transaction. Additional and/or alternate authorized determination times may be used within the scope of this disclosure.

Figure 3:
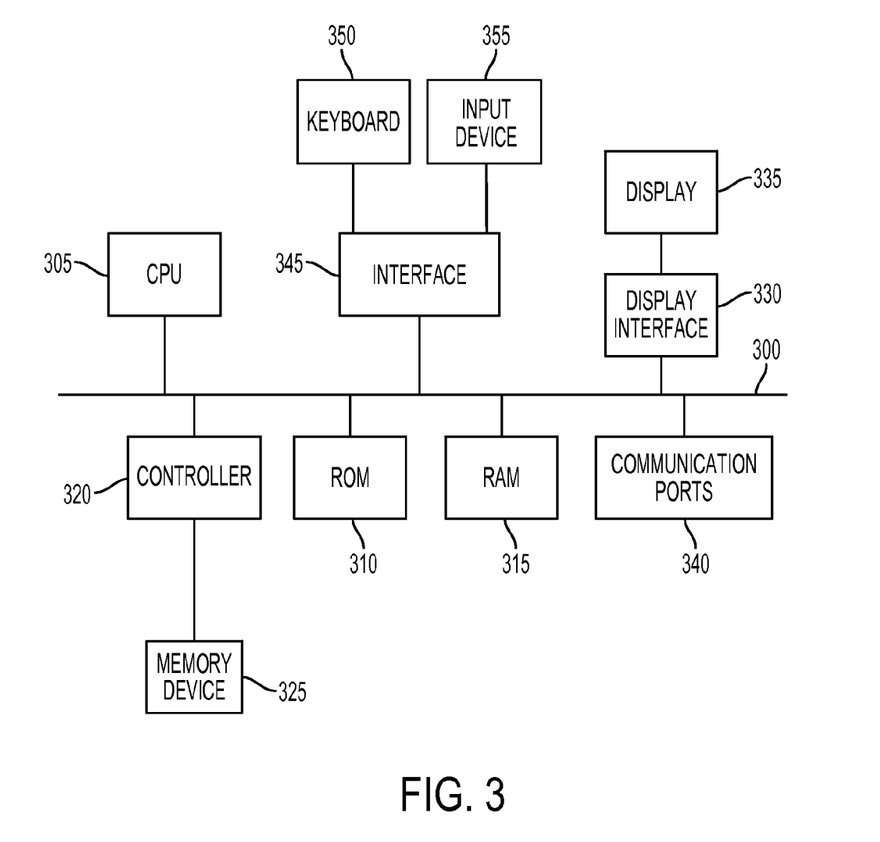
FIG. 3 depicts example optional elements of a computing device that may be used with various embodiments of this disclosure.

FIG. 3 is a block diagram of hardware that may be used to contain or implement program instructions according to an embodiment. A bus 300 serves as the main information pathway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable storage medium such as a hard disk, compact disk, a digital disk, flash memory, a memory card, a USB drive, an optical disc storage medium, such as Blu-Ray™ disc, and/or other recording medium.

An optional display interface 330 may permit information from the bus 300 to be displayed on the display 335 in audio, visual, graphic or alphanumeric format. Communication with external devices may occur using various communication ports 340. A communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of authorizing a transaction, the method comprising:
   receiving, by an interface frontend device of a hosted service from a client device, a request to access an account;
   determining, by an interface backend device, that a user of the client device is permitted to access the account; and
   in response to determining that the user is permitted to access the account:
      initiating, by the interface backend device, an account session and generating a login credential that includes an indication that the user is logged into the account,
      receiving, from the client device, a request to initiate a transaction,
      determining, by the interface backend device, that the transaction is a long-lived transaction,
      in response to determining that the transaction is a long-lived transaction, creating, by the interface backend device, a transaction credential associated with the long-lived transaction,
      determining, by the interface backend device, that the account session has expired,
      updating, by the interface backend device, the login credential to include an indication that the user is not logged into the account,
      determining, by the interface backend device, based at least in part on the transaction credential, that execution of the long-lived transaction is authorized after expiration of the account session, and
      in response to determining that execution of the long-lived transaction is authorized after expiration of the account session, allowing, by the interface frontend device, the long-lived transaction to execute after the account session has expired.

2. The method of claim 1, wherein:
   receiving a request to access an account comprises receiving a request to access an account comprising at least a username and a password, and
   determining that the user is permitted to access the account comprises comparing at least the username and the password to at least a portion of stored account information.

3. The method of claim 1, wherein determining that the transaction is a long-lived transaction comprises:
   determining a transaction type associated with the transaction; and
   determining whether the transaction is a long-lived transaction based on the transaction type.

4. The method of claim 1, wherein determining that the transaction is a long-lived transaction comprises receiving, from the client device, an indication of whether the transaction is a long-lived transaction.

5. The method of claim 1, wherein determining that the transaction is a long-lived transaction comprises:
   determining whether execution of the transaction will be delayed because of a status of one or more components of the hosted service; and
   in response to determining that execution of the transaction will be delayed because of a status of one or more components of the hosted service, determining that the transaction is a long-lived transaction.

6. The method of claim 1, wherein creating a transaction credential comprises creating a transaction credential comprising an indication of a time period during which the long-lived transaction is authorized to execute.

7. The method of claim 6, wherein creating a transaction credential comprising an indication of a time period during which the long-lived transaction is authorized to execute comprises determining the time period based on a transaction type associated with the transaction.

8. The method of claim 6, wherein creating a transaction credential comprising an indication of a time period during which the long-lived transaction is authorized to execute comprises receiving the time period from the client device.

9. The method of claim 1, wherein determining, based at least in part on the transaction credential, that the execution of the long-lived transaction is authorized comprises:
   determining whether the transaction credential is valid; and
   in response to determining that the transaction credential is valid, authorizing execution of the long-lived transaction.

10. The method of claim 1, wherein determining, based at least in part on the transaction credential, that the execution of the long-lived transaction is authorized comprises:
    determining whether the transaction credential is valid;
    in response to determining that the transaction credential is valid, identifying data to be accessed by the long-lived transaction; and
    determining whether execution of the long-lived transaction is authorized based on, at least in part, the identified data.

11. The method of claim 10, wherein determining that execution of the long-lived transaction is authorized based on the identified data comprises:
    determining a creation time associated with creation of the transaction credential;
    determining whether at least a portion of the identified data has been changed since the creation time; and
    in response to determining that at least a portion of the identified data has been changed since the creation time, determining that execution of the long-lived transaction is not authorized.

12. The method of claim 10, wherein determining that execution of the long-lived transaction is authorized based on the identified data comprises:
    determining a creation time associated with creation of the transaction credential;
    determining whether at least a portion of the identified data has been changed since the creation time; and
    in response to determining that no portion of the identified data has been changed since the creation time, determining that execution of the long-lived transaction is authorized.

13. A system for authorizing a transaction, the system comprising:
    an interface frontend device of a hosted service;

an interface backend device of the hosted service; and a non-transitory computer-readable storage medium in communication with a storage device, wherein the computer-readable storage medium comprises one or more programming instructions that, when executed by a computing device, will:

cause the interface frontend device to receive, from a client device, a request to access an account,  cause the interface backend device to determine that a user of the client device is permitted to access the account, and  in response to determining that the user is permitted to access the account, cause the hosted service to:

initiate an account session and generate a login credential that includes an indication that the user is logged into the account,   receive, from the client device, a request to initiate a transaction,   determine that the transaction is a long-lived transaction,   in response to determining that the transaction is a long-lived transaction, create a transaction credential associated with the long-lived transaction,   determine that the account session has expired,   update the login credential to include an indication that the user is not logged into the account,   determine, based at least in part on the transaction credential, that the execution of the long-lived transaction is authorized after expiration of the account session, and   in response to determining that execution of the long-lived transaction is authorized after expiration of the account session, cause the hosted service to allow the long-lived transaction to execute after the account session has expired.

14. The system of claim 13, wherein:

the one or more programming instructions that, when executed, cause the computing device to receive a request to access an account comprise one or more programming instructions that, when executed, cause the interface frontend device to receive a request to access an account comprising at least a username and a password, the one or more programming instructions that, when executed, cause the computing device to determine that a user is permitted to access the account comprise one or more programming instructions that, when executed, cause the computing device to compare at least the username and the password to at least a portion of stored account information.

15. The system of claim 13, wherein the one or more programming instructions that, when executed, cause the hosted service to determine that the transaction is a long-lived transaction comprise one or more programming instructions that, when executed, cause the hosted service to:

determine a transaction type associated with the transaction; and determine whether the transaction is a long-lived transaction based on the transaction type.

16. The system of claim 13, wherein the one or more programming instructions that, when executed, cause the hosted service to determine that the transaction is a long-lived transaction comprise one or more programming instructions that, when executed, cause the hosted service to receive, from the client device, an indication of whether the transaction is a long-lived transaction.

17. The system of claim 13, wherein the one or more programming instructions that, when executed, cause the hosted service to create a transaction credential comprise one or more programming instructions that, when executed, cause the hosted service to create a transaction credential comprising an indication of a time period during which the long-lived transaction is authorized to execute.

18. The system of claim 17, wherein the one or more programming instructions that, when executed, cause the hosted service to create a transaction credential comprising an indication of a time period during which the long-lived transaction is authorized to execute comprise one or more programming instructions that, when executed, cause the hosted service to determine the time period based on a transaction type associated with the transaction.

19. The system of claim 17, wherein the one or more programming instructions that, when executed, cause the hosted service to create a transaction credential comprising an indication of a time period during which the long-lived transaction is authorized to execute comprise one or more programming instructions that, when executed, cause the hosted service to receive, from the client device, the time period.

20. The system of claim 13, wherein the one or more programming instructions that, when executed, cause the hosted service to determine, based on at least in part the transaction credential, that the execution of the long-lived transaction is authorized comprise one or more programming instructions that, when executed cause the hosted service to:

determine whether the transaction credential is valid; and in response to determining that the transaction credential is valid, authorize execution of the long-lived transaction.

21. The system of claim 13, wherein the one or more programming instruction that, when executed, cause the hosted service to determine, based on at least in part of the transaction credential, that the execution of the long-lived transaction is authorized comprise one or more programming instructions that, when executed, cause the hosted service to:

determine whether the transaction credential is valid;

in response to determining that the transaction credential is valid, identify data to be accessed by the long-lived transaction; and  determine whether execution of the long-lived transaction is authorized based on, at least in part, the identified data.

22. The system of claim 21, wherein the one or more programming instruction that, when executed, cause the hosted service to determine that execution of the long-lived transaction is authorized based on the identified data comprise one or more programming instructions that, when executed, cause the hosted service to:

determine a creation time associated with creation of the transaction credential; determine whether at least a portion of the identified data has been changed since the creation time; and  in response to a determination that at least a portion of the identified data has been changed since the creation time, determine that execution of the long-lived transaction is not authorized.

23. The system of claim 21, wherein the one or more programming instruction that, when executed, cause the hosted service to determine that execution of the long-lived transaction is authorized based on the identified data comprise one or more programming instruction that, when executed, cause the hosted service to:
- determine a creation time associated with creation of the transaction credential;
- determine whether at least a portion of the identified data has been changed since the creation time; and
- in response to a determination that no portion of the identified data has been changed since the creation time, determine that execution of the long-lived transaction is authorized.

* * * * *